United States Patent
Katagiri et al.

[11] Patent Number: 5,325,148
[45] Date of Patent: Jun. 28, 1994

[54] CAMERA HAVING AN EXPOSURE CONTROL DEVICE FOR MINIMIZING HEATING AND POWER CONSUMPTION OF A DRIVING DEVICE

[75] Inventors: Moriya Katagiri; Toshiaki Ishimaru, both of Hachioji, Japan

[73] Assignee: Olympus Optical Co., Ltd., Tokyo, Japan

[21] Appl. No.: 44,405

[22] Filed: Apr. 8, 1993

[30] Foreign Application Priority Data

Apr. 9, 1992 [JP] Japan .................. 4-089015

[51] Int. Cl.$^5$ .............................................. G03B 9/08
[52] U.S. Cl. ............................ 354/440; 354/235.1
[58] Field of Search ............... 354/435, 436, 437, 440, 354/234.1, 235.1, 446, 453, 271.1

[56] References Cited

U.S. PATENT DOCUMENTS

| | | | |
|---|---|---|---|
| 3,744,385 | 7/1973 | Burgarella et al. | 354/440 |
| 3,769,893 | 11/1973 | Douglas | 354/235.1 |
| 3,791,278 | 2/1974 | Biber et al. | 354/440 |

FOREIGN PATENT DOCUMENTS 63-54131 of 1988 Japan .
3-61934 of 1991 Japan .
194912 of 1992 Japan .

Primary Examiner—W. B. Perkey
Attorney, Agent, or Firm—Louis Weinstein

[57] ABSTRACT

An exposure control device for a camera having a shutter mechanism, a solenoid serving as an electromagnetic drive, a presser for pressing a solenoid plunger, and a control circuit for conduction control for the solenoid. After the solenoid attracts the plunger to open the shutter, conduction voltage for holding the plunger is controlled within a permissible range and become lower than the conduction voltage utilized for initially attracting the plunger. The heating of the solenoid is thus minimized. This control sequence prevents the breakdown of the solenoid and improved reliability in exposure control. Furthermore, power consumption in the camera is minimized.

52 Claims, 10 Drawing Sheets

CAMERA HAVING AN EXPOSURE CONTROL DEVICE FOR MINIMIZING HEATING AND POWER CONSUMPTION OF A DRIVING DEVICE

BACKGROUND OF THE INVENTION

1. Field of the Invention

The present invention relates to an exposure control device for a camera using a shutter whose driving source is a solenoid.

2. Description of the Related Art

In a conventional exposure control device using a solenoid, the solenoid serving as a driving source is driven with such a voltage that is invariable even while a plunger is being attracted or after the plunger has been attracted. When the plunger is attracted, the attraction for the plunger surpasses a repulsive spring force.

FIG. 13 is a graph showing the relationships between the attraction for the plunger of a solenoid used in a conventional exposure control device and the repulsive spring force, and the stroke of the plunger. In FIG. 13, curves Fv1 and Fv2 (drawn in solid lines) represent the characteristics of attractions with solenoid conduction voltages V1 and V2, wherein the voltage V2 is larger than the voltage V1. A curve Fs (drawn in a dashed line) represents the characteristic of the force of a repulsive spring.

In the foregoing conventional exposure control device, the solenoid is driven with the conduction voltage V2 in FIG. 13 during exposure control. When the plunger is repulsed, the attraction assumes a sufficiently large required value relative to the repulsive spring force. When the plunger is attracted, the attraction becomes too large relative to the repulsive spring force.

In the foregoing conventional exposure control device using the solenoid as a driving source, however, when the plunger is attracted, the attraction for the plunger is unnecessarily larger than the repulsive spring force. An excess force is therefore imposed on the plunger. In case the conduction voltage is decreased to the voltage V1, when the plunger is attracted, the attraction for the plunger assumes a sufficient required value. When the plunger is repulsed, however, the attraction is weaker than the repulsive spring force and fails to ensure perfect operation. This kind of problem has arisen in conventional solenoid-driven exposure control devices. In the aforesaid conventional exposure control device, when exposure is performed at a low shutter speed, the heating of the solenoid sometimes damages the driving source. Moreover, excess power is consumed because of the application of a voltage much higher than the voltage required when the plunger is attracted. This poses many problems including that the usable frequency of a battery serving as a power supply decreases.

In an exposure control device disclosed in Japanese Patent Laid-Open No. 4-194912, the repulsive spring force for a plunger is slightly weaker than the attraction for the plunger and has a non-linear characteristic. A high-precision exposure control mechanism is thus realized with a simple mechanism.

A device disclosed in Japanese Utility Model Laid-Open No. 63-54131 uses the forces of two repulsive springs to meet the attraction for a plunger, thus improving the precision in exposure control.

In the disclosures of the unexamined publications, similarly to the aforesaid device, a voltage required for attracting a plunger is applied for a prolonged period of time even after attraction is achieved. The plunger is still subject to damage resulting from heating.

OBJECTS AND SUMMARY OF THE INVENTION

An object of the present invention is to provide an exposure control device for a camera that consumes limited power to eliminate problems concerning a temperature rise in a device, increases the usable frequency of the limited power, and permits highly-reliable exposure at a low shutter speed.

An exposure control device for a camera according to the present invention comprises an electromagnetic driving means that consists of a solenoid and a plunger and in which when the solenoid conducts, the plunger is attracted, a means for pressing the plunger toward repulsing it from the solenoid, a shutter that is opened when the plunger is attracted and exposes a film surface to light, and a conduction control means that after the start of attracting the plunger, controls the conducting state of the solenoid so that the attraction for the plunger will slightly exceed the pressing force the pressing means provides when the plunger is attracted.

When the film surface is to be exposed to light, the solenoid is energized. The plunger is then attracted against the pressing force of the pressing means. Thus, the film surface is exposed to light. For a duration after attraction is achieved and until exposure is completed, the conducting state of the solenoid is controlled so that the attraction for the plunger will slightly exceed the pressing force the pressing means provides when the plunger is attracted.

The other features and advantages of the present invention will be apparent from the description below.

DETAILED DESCRIPTION OF THE PREFERRED EMBODIMENTS

Embodiments of the present invention will be described in conjunction with the drawings.

Figure 1:
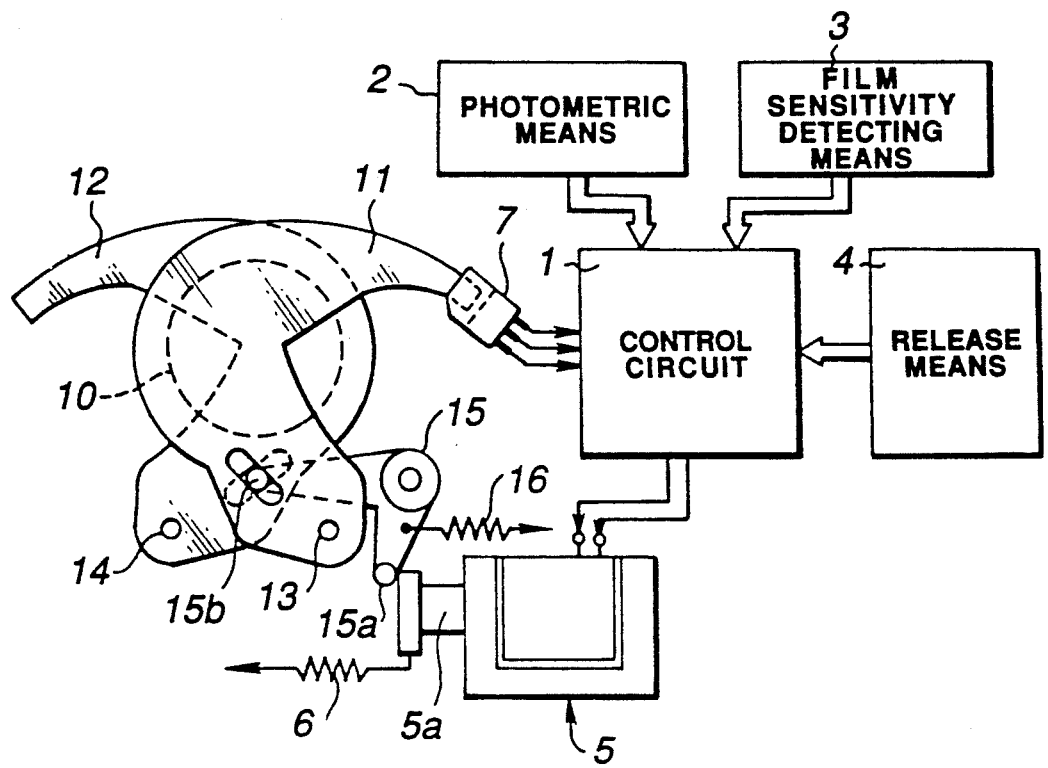
FIG. 1 is a block configuration diagram of a major portion of an exposure control device for a camera representing a first embodiment of the present invention.
Figure 2:
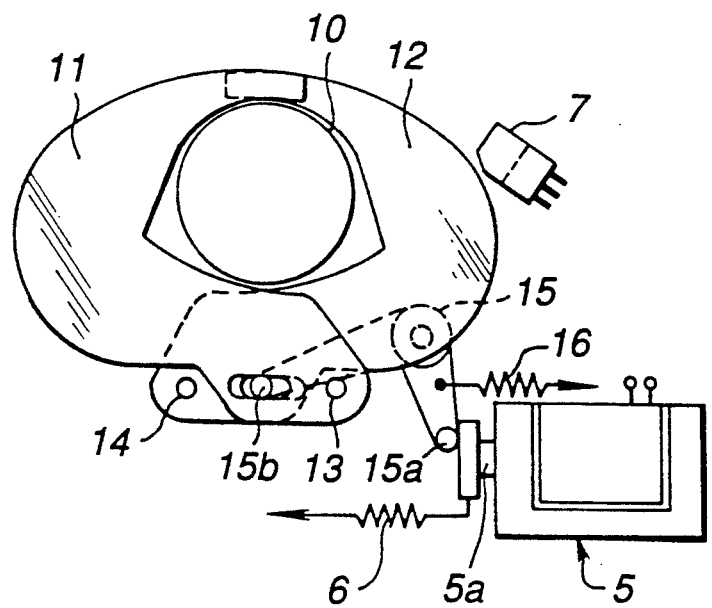
FIG. 2 shows a state in which an exposure aperture of a shutter mechanism in the exposure control device shown in FIG. 1 is open.

FIG. 1 is a block configuration diagram of a major portion of an exposure control device for a camera that is a drive representing the first embodiment of the present invention. FIG. 2 shows a state in which a shutter mechanism in the exposure control device is open. The shutter mechanism shown in FIG. 1 is closed.

The exposure control device for a camera consists mainly of a shutter mechanism that is a driven means, a solenoid 5 and a plunger 5a to be inserted into the solenoid which constitute an electromagnetic driving means for driving the shutter mechanism, a repulsive spring 6 that presses the plunger 5a toward repulsing it from the solenoid and serves as second pressing means, a control circuit 1 serving as a conduction control means for controlling the conduction of the solenoid 5, a photometric means 2 for metering the luminance of a subject, a film-sensitivity sensing means 3, and a release means 4 that is a trigger switch for fetching exposure start instruction information.

The shutter mechanism comprises sectors 11 and 12, a sector lever 15, and a photo-interruptor (PI) 7. As shown in FIGS. 1 and 2, the pair of sectors 11 and 12 having an exposure aperture 10 are held by pins 13 and 14 implanted in a shutter base, which is not shown. The sectors 11 and 12 are freely pivotable between a closed position (See FIG. 1) at which the aperture is shielded and an open position (See FIG. 2) at which the aperture is exposed. The sector lever 15 is supported by the shutter base so as to be able to swivel freely. A pin 15b implanted at the distal end of one arm of the sector lever 15 is encaged in cam holes of the sectors 11 and 12, so that the pin 15b can slide freely. A pin 15a implanted at the distal end of the other arm thereof is in contact with the end surface of the plunger 5a of the solenoid 5.

An aperture spring 16 serving as a first pressing means that presses the sectors 11 and 12 toward opening the aperture 10 is laid between the sector lever 15 and the shutter base. When the plunger 5a is attracted or repulsed, the sector lever 15 swivels and the sectors 11 and 12 open or close. The sector lever 15 is, as mentioned above, merely in contact with the plunger 5a. The opening and closing of the sectors 11 and 12 interlocked with the sector level 15 therefore is not synchronous with but lags behind the attracting of the plunger 5a.

The photo-interruptor 7 is united with the shutter base, and located so that the arm of the sector 11 will intercept detection light from the photo-interrupter 7 when closed as shown in FIG. 1, and pass the light immediately before the aperture is exposed. An output the photo-interruptor 7 provides immediately before the aperture is exposed is input as an exposure start trigger signal to the control circuit 1.

Figure 3:
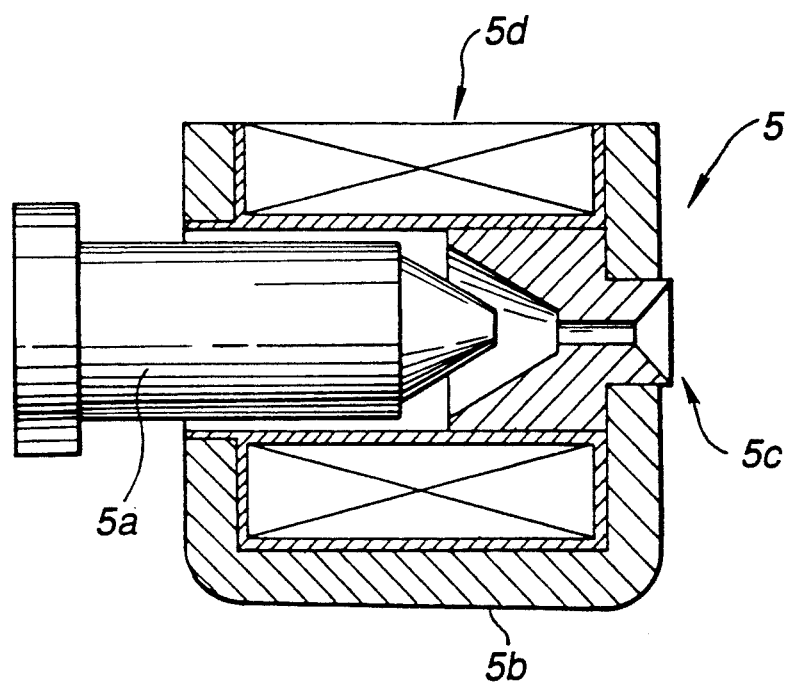
FIG. 3 shows a longitudinal cross section of a solenoid employed for the exposure control device of FIG. 1.

The solenoid 5 has a structure shown in the longitudinal cross-sectional diagram of FIG. 3. A solenoid yoke 5b having a stationary iron core 5c for attraction is fixed to the shutter base which is not shown. A coil 5d is wound in the solenoid yoke 5b. The plunger 5a is inserted in the solenoid yoke 5b so as to be able to slide freely. The repulsive spring 6 for pressing the plunger toward repulsing it from the solenoid 5 is laid between the plunger 5a and shutter base. When the plunger 5a operates toward being attracted, the sectors 11 and 12 pivot to open.

The control circuit 1, which has a built-in CPU, computes an exposure value using the photometric information fed by the photometric means 2 and the ISO information fed by the film-sensitivity sensing means 3. With an exposure start instruction sent from the release means 4, the control circuit 1 instructs to start the conduction of the coil 5d of the solenoid 5. When the sectors 11 and 12 start to open, a trigger signal is fetched from the photo-interruptor 7 and counting is started to define an exposure time. When an exposure time associated with the exposure value has passed, the solenoid 5 is de-energized. When the period for which the solenoid 5 is conducting becomes longer than a predetermined value, the control circuit 1 decreases the conduction voltage to a specified value, which will be described later, and thus diminishes the holding force of the plunger 5a. At this time, a timer indicating the passing of time since the start of conduction or a timer indicating the passing of time since the output of a trigger signal by the photo-interruptor 7 is employed.

Figure 13:
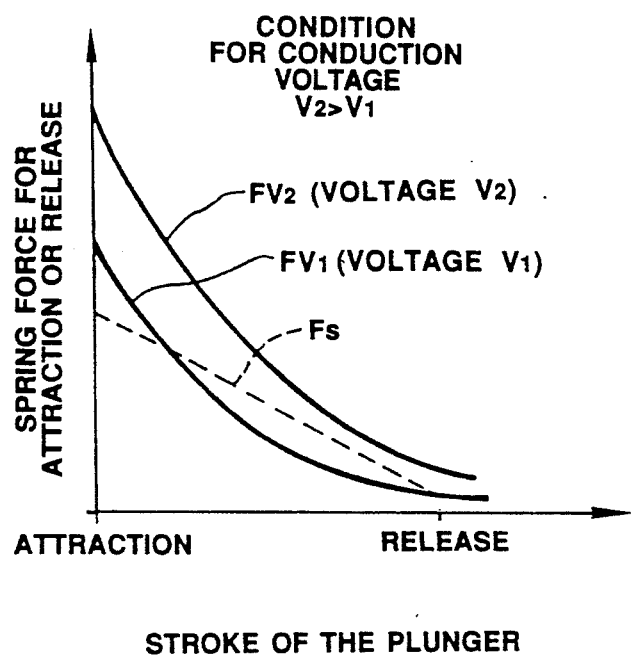
FIG. 13 is a graph showing the characteristics of the attractions for a solenoid and the force of a repulsive spring in a conventional exposure control device.

The control operations of the exposure control device for a camera of this embodiment having the foregoing configuration will be described. First, the release means 4 is manipulated. Photometric information and ISO information are then fetched from the photometric means 2 and film-sensitivity sensing means 3 respectively. Using this information, an exposure value (EV) is calculated. When an operation that is one of a series of operations succeeding release and to be performed before the shutter is opened, for example, lens focusing drive is completed, the solenoid 5 is energized. The conduction voltage at this time is the full voltage V2 shown in FIG. 13, which is high enough to attract the plunger 5a. The plunger 5a is attracted by the solenoid 5 against the force of the repulsive spring 6.

When the end surface of the plunger 5a withdraws, the sector lever 15 swivels counterclockwise due to the pressing force of the aperture spring 16. The transition of states is apparent from FIGS. 1 and 2. The sectors 11 and 12 are driven by the pin 15b of the sector lever 15 encaged in the cam holes thereof, and pivot to open. Immediately before the exposure aperture 10 opens, the arm of the sector 11 withdraws from the detection light path. The photo-interruptor 7 outputs a trigger signal, and the control circuit allows the exposure control timer to start counting at the time of input of the trigger signal.

When time sufficient for attracting the plunger 5a has elapsed, the conduction voltage is decreased to a specified voltage. What is referred to as a specified voltage is a conduction voltage allowing the plunger 5 to get an attraction that slightly exceeds a pressing force the repulsive spring 6 provides when the plunger is attracted. The specified voltage corresponds to the conduction voltage VI in FIG. 13. When time equivalent to the calculated exposure value has elapsed, the solenoid 5 is de-energized. This causes the attraction for the plunger 5a to die out. The repulsive spring 6 causes the plunger 5a to move toward being repulsed. The sector lever 15 is then pressed by the end surface of the plunger 5a and swivels clockwise in FIG. 1 or 2 against the force of the aperture spring 16. The sectors 11 and 12 pivot to close owing to the sector lever 15, and shield the aperture 10. Thus, exposure control terminates.

Now, a standard temperature rise (degrees) of the solenoid 5 is calculated using an excitation time, a heat transfer coefficient, and a shape of a coil. Once the shapes of the plunger 5a and solenoid are determined, the temperature rise $\theta$ becomes dependent on the conduction (excitation) current; that is, conduction (excitation) voltage V (volt), and the resistance of the coil R (ohm). Assuming that $\alpha$ is a shape factor, the temperature rise $\theta$ is represented as follows:

$$\theta = \alpha \cdot (V/R)^2 \qquad (1)$$

According to this expression, when the conduction voltage V is decreased, the temperature rise in the coil can be suppressed by the square of the decrease.

Figure 4:
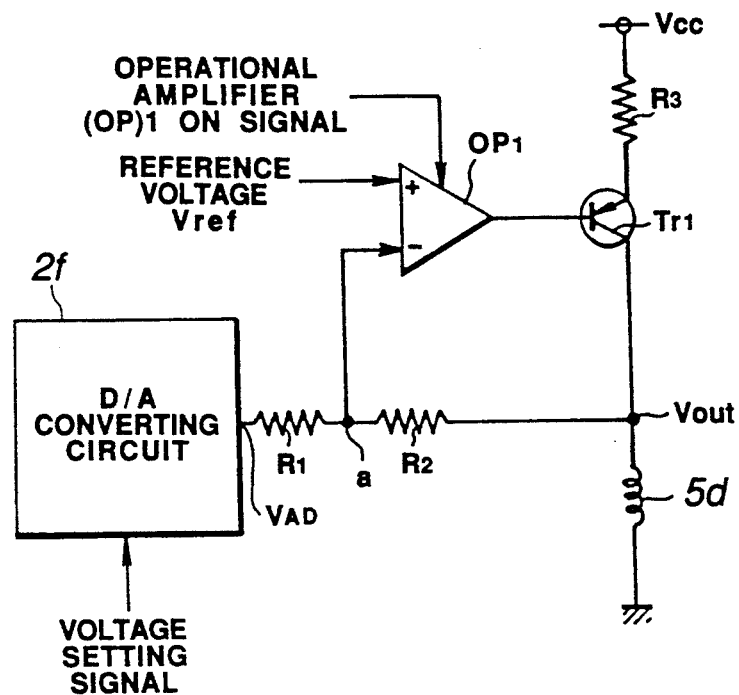
FIG. 4 shows a solenoid drive circuit in the exposure control device of FIG. 1.

FIG. 4 shows a drive circuit for controlling the solenoid 5 with a constant voltage.

An output $V_{AD}$ of a D/A converting circuit 21 whose voltage can be set using the CPU incorporated in the control circuit 1 is fed to the solenoid 5 through the plus terminal of the coil 5d thereof and to a transistor Tr1 via resistors R1 and R2. A reference voltage Vref is fed to the operational amplifier OP1 through the plus terminal thereof. The resistors R1 and R2 are connected to the minus (point a) terminal of the operational amplifier OP1. The other end of the resistor R2 is connected to the collector of the transistor Tr1 and to the plus terminal of the coil 5d in the solenoid 5. The voltage at the plus terminal is regarded as the conduction voltage of the solenoid 5 and represented as Vout. When a voltage setting signal is fed to the D/A converting circuit 21 and an operational-amplifier on signal is used to turn on the operational amplifier OP1, an imaginary short circuit occurs. At this time, the following equation is established:

$$Vref = V_{AD} + R1/(R1+R2) \cdot (Vout - V_{AD}) \qquad (1)$$

By modifying the equation (1), the conduction voltage Vout is provided as follow:

$$Vout = V_{AD} + ((R1+R2)/R1) \cdot (Vref - V_{AD}) \qquad (2)$$

The base of the transistor Tr1 is controlled by the operational amplifier so that the above equation will be established. The presence of a resistor R3 between the transistor Tr1 and a supply voltage Vcc prevents overcurrent from flowing into the solenoid 5.

Figure 5:
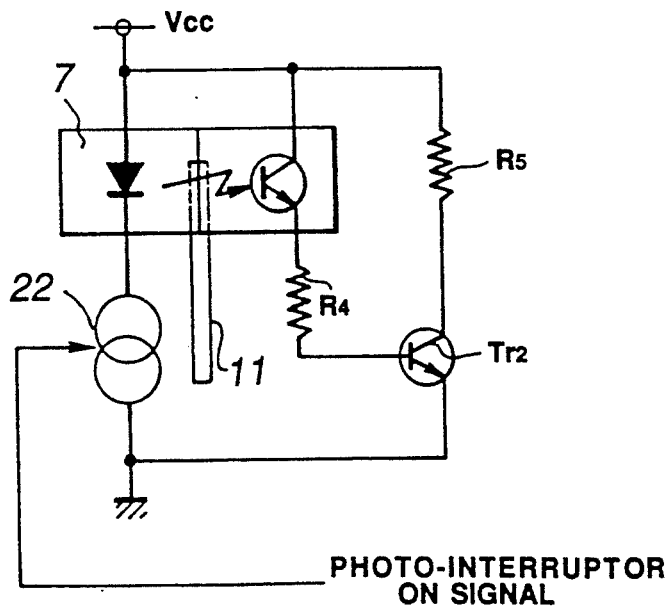
FIG. 5 shows a photo-interruptor drive circuit in the exposure control device of FIG. 1.

FIG. 5 shows a drive circuit for the photo-interruptor 7.

An LED incorporated in the photo-interruptor 7 emits light, as shown in FIG. 5, when a constant current circuit 22 is turned on with a photo-interruptor on signal. An emitter output of the photo-interruptor 7 passes through a resistor R4 and enters the base of a transistor Tr2. The collector of the transistor Tr2 is connected to a pull-up resistor R5 and to a photo-interruptor input terminal PIO, which is not shown, of the CPU in the control circuit 1. When the photo-interruptor is turned on, if the arm of the sector 11 lies in the photo-interruptor 7 (the shutter is closed), current does not flow into or is cut off from the base of the transistor Tr2. PIO is then driven high. When the arm of the sector 11 does not lie in the photo-interruptor 7 (the shutter is open), PIO is driven low.

Figure 6:
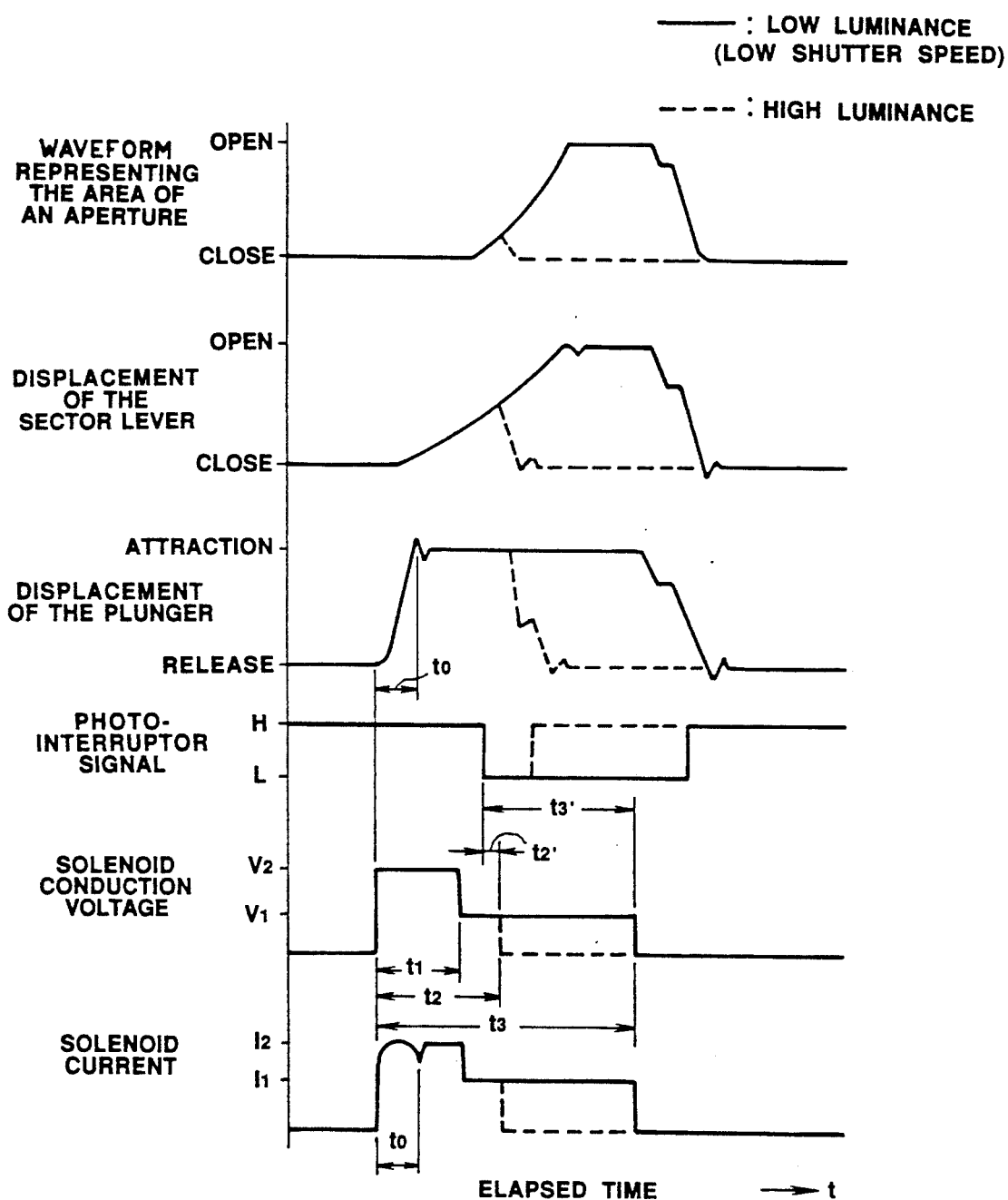
FIG. 6 is a timing chart for the exposure control operations performed by the exposure control device of FIG. 1.

FIG. 6 is a timing chart for the exposure control operations performed by the device having the aforesaid configuration. When the voltage V2 is applied to the solenoid 5, as shown in FIG. 6, an attraction for the plunger 5a occurs. The plunger 5a is then attracted against the force of repulsive spring 6. A time t0 is required from the start of conduction to the accomplishment of attraction. When the end surface of the plunger 5a parts from the sector lever 15, the sector lever 15 swivels counterclockwise in FIG. 1 or 2 owing to the aperture spring 16, and the sectors 11 and 12 start pivoting to open. The time t0 depends on a design but ranges from several milliseconds to ten and several milliseconds, as long as a shutter of a camera is concerned. The conduction voltage applied to the solenoid 5 is decreased from the voltage V2 to V1 for a conduction time t1 that is longer by several milliseconds than the time t0 but shorter by several milliseconds from t2 to be described later. Needless to say, even the voltage V1 makes it possible to attract and hold the plunger 5a against the force of the repulsive spring 6. The conduction current of the solenoid 5 lessens from I2 to I1.

When conduction is continued, the sectors 11 and 12 withdraw from the detection light path of the photo-interruptor 7. The photo-interruptor signal then goes from high to low, which is used as an exposure control trigger signal for starting exposure value control. With the output of the trigger signal, counting is started to define an exposure control time. The exposure control time is an interval of time defined by starting counting with the output of the trigger signal by the photo-interruptor 7 after the shutter starts opening. When the luminance of a subject is equivalent to a high-luminance limit rated in the specification of a camera, after an exposure control time t2' permitting the high luminance has passed, the solenoid is de-energized. The time t2' is provided as a time t2 when counting is started with the start of conduction of the solenoid. When conduction is discontinued, the attraction for the plunger 5a dies out. The force of the repulsive spring 6 repulses the plunger 5a from the solenoid 5. In a stroke of repulsion, the plunger 5a swivels the sector lever 15 clockwise. This causes the sectors 11 and 12 to close. The exposure control time for a low-luminance subject is indicated as t3' in FIG. 6. The time t3' is provided as t3 when counting is started with the start of conduction of the solenoid 5.

Figure 7:
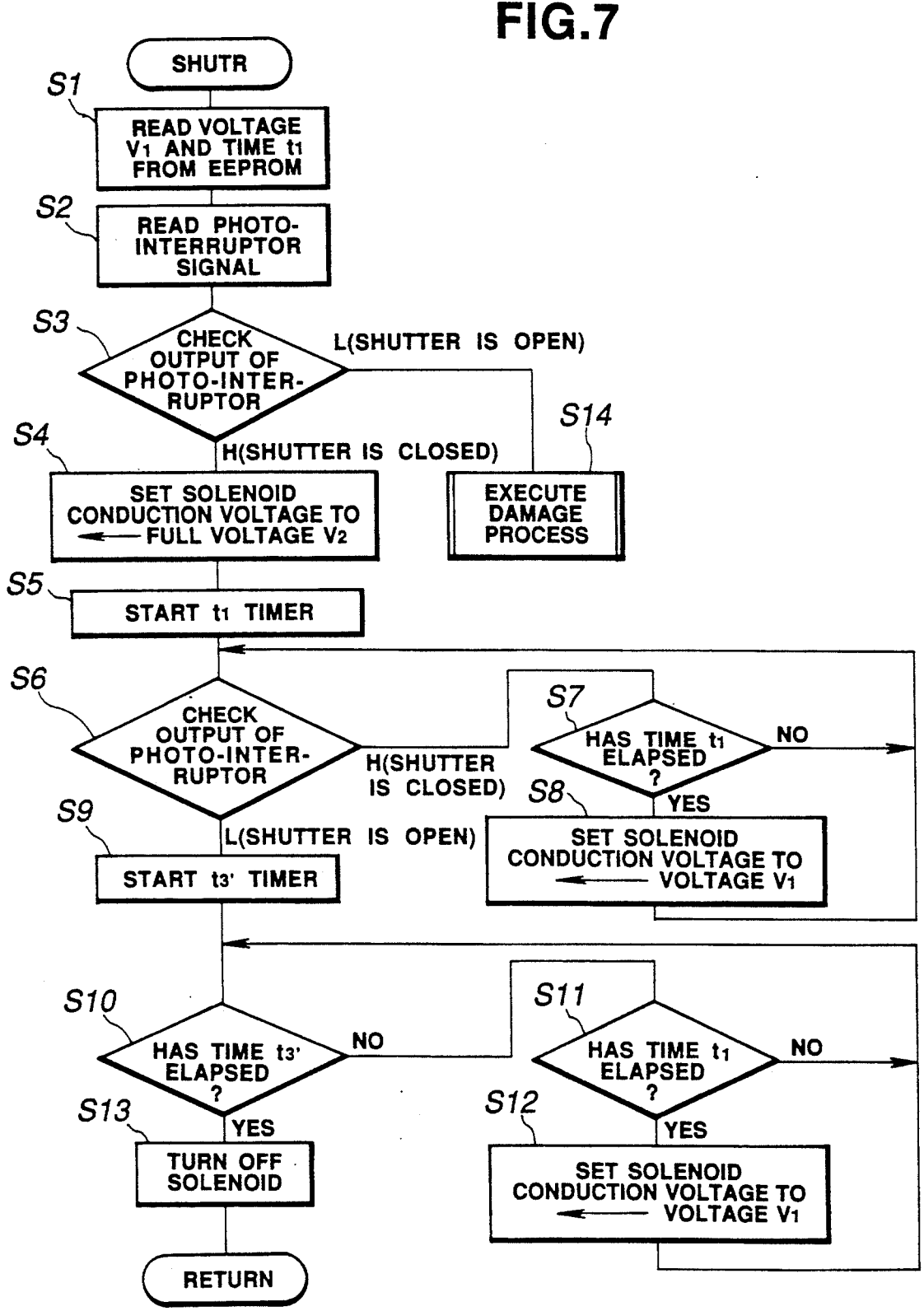
FIG. 7 is a flowchart of subroutine "SHUTR" for controlling a shutter in the exposure control device of FIG. 1.

FIG. 7 is a flowchart of subroutine "SHUTR" for controlling the shutter in the exposure control device of this embodiment. It must be noted that the flowchart shows processing for a low-luminance subject.

In this processing, first, after the shutter is opened, the values of the plunger voltage V1 and time t2 are read from a nonvolatile memory (EEPROM) which is not shown (step S1). The output PIO of the photo-interruptor 7 is then checked (step S3). Although the solenoid has not been energized, if PIO is low and the shutter is open, it is determined that the shutter mechanism malfunctions. Control passes to a step S14. Damage processing is performed, and the camera is locked. On the other hand, when the output PIO of the photo-interruptor 7 is high, it is determined that the shutter is closed and operates normally. Control then passes to a step S4. The conduction voltage of the plunger 5 is set to the full voltage V2. In constant voltage drive of FIG. 4, the output voltage $V_{AD}$ of the D/A converting circuit 21 is set to zero volt. The equation (2) is then expressed as follows:

$$Vout = V_{AD} + ((R1+R2)/R1) \cdot Vref \quad (2')$$

Thus, Vout becomes maximum.

After the solenoid 5 is energized, a t1 timer is started. It is waited whichever passes earlier; the time required for the shutter to open (PIO goes low) or the time t1 (steps S6 and S7). If the time t1 has passed earlier, the conduction voltage of the solenoid 5 is set to V1 (step S8). After the shutter is opened, when the output PIO of the photo-interruptor 7 goes low, a timer for giving an indication when the exposure time t3' for a low-luminance subject has passed is started (step S9). Control then passes to steps S10 and S11. If the time t3' has passed or the time t1 has not been passed, the passing of the time is checked. When the time t1 has passed, the conduction voltage of the solenoid 5 is set to V1 (step S12). Control then returns to the step S10. When the time t3' has passed, the supply of the conduction voltage of the plunger 5 is turned off (step S13). This routine then terminates.

As described above, in the exposure control device of this embodiment, the voltage is decreased immediately after the plunger 5 is attracted. Therefore, the power consumption can be minimized and the service life of a battery can be prolonged. Furthermore, the heating of the solenoid can be minimized, which prevents the breakdown of the solenoid. As a result, the reliability in exposure control improves.

Furthermore, the timing of decreasing the voltage comes before a shortest exposure control time passes. When the plunger is to be de-energized as part of exposure control, the voltage has already decreased. This means that a time lag in repulsing the plunger, which results from a voltage fluctuation, can be eliminated. Exposure control is thus free from any adverse effect.

Next, an exposure control device for a camera that is a drive representing the second embodiment of the present invention will be described.

Figure 8:
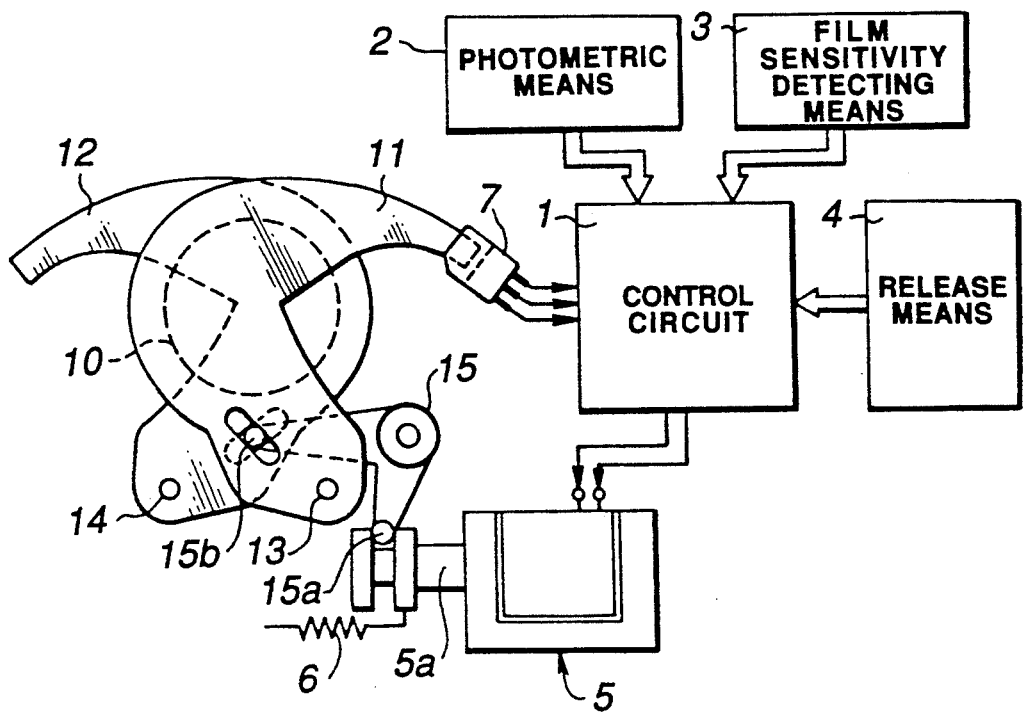
FIG. 8 is a block configuration diagram of a major portion of an exposure control device for a camera representing a second embodiment of the present invention.
Figure 9:
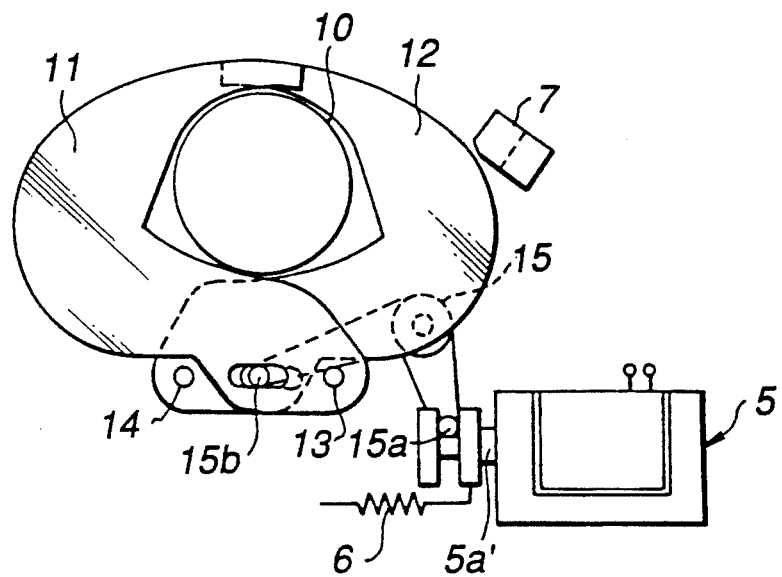
FIG. 9 shows a state in which an exposure aperture of a shutter mechanism in the exposure control device of FIG. 8 is open.

FIG. 8 shows a configuration of a major portion of the device. FIG. 9 shows a state in which an exposure aperture 10 of a shutter mechanism is open. In FIG. 8, the aperture 10 of the shutter mechanism is closed. The configuration of this device is identical to that of the first embodiment except part of the shutter mechanism that is a driven means. Specifically, a shutter base has the exposure aperture 10. Sectors 11 and 12 are supported so as to be freely pivotable between a position at which the exposure aperture 10 is exposed and a position at which the exposure aperture 10 is shielded. A photo-interruptor 7, which outputs a trigger signal when invaded by the arm of the sector 11, is fixed to the shutter base. A sector lever 15 having a pin 15b, which is encaged in and slides in the cam holes of the sectors 11 and 12, at the end of the arm thereof is supported so as to be able to swivel freely. A pin 15a at the other end of the sector lever 15 is encaged in a ditch at the distal end of a plunger 5a' which is held by a solenoid 5 serving as an electromagnetic driving means so as to be able to advance straight. Since the pin 15a at the other end of the sector lever 15 is encaged in the ditch at the distal end of the plunger 5, the sector lever 15 and sectors 11 and 12 are driven synchronously with the attracting of the plunger 5a. In this embodiment, the sector lever 15 is not coupled with a pressing spring for swiveling the sector lever 15. A repulsive spring 6 serving as a pressing means for pressing the plunger 5 toward repulsing it is laid between the plunger 5 and shutter base. A control circuit 1 serving as a conduction control means for controlling this device controls a conduction time or voltage for the solenoid 5 on the basis of photometric information, ISO information, release information, and an output of the photo-interruptor.

Figure 10:
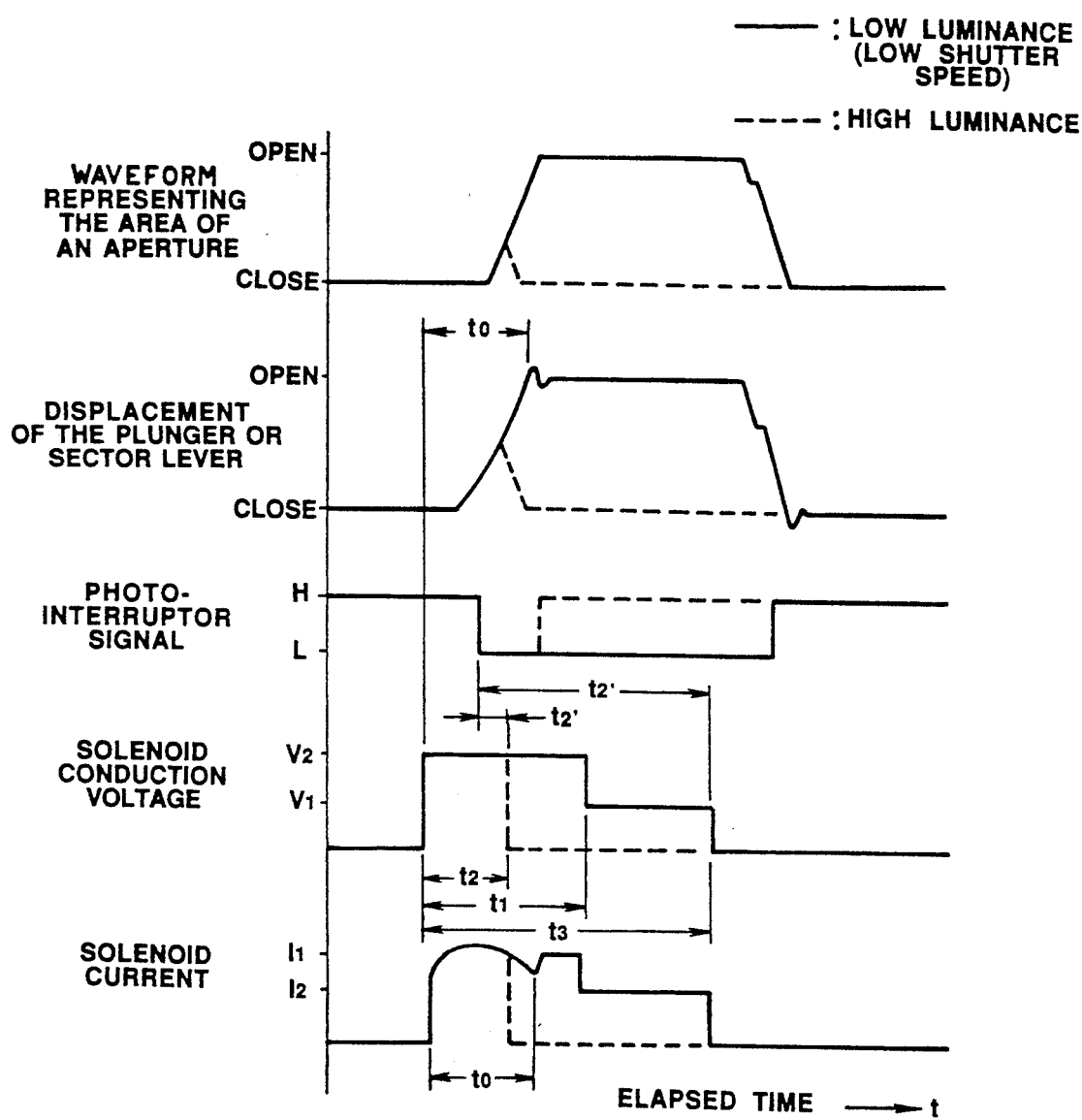
FIG. 10 is a timing chart for the exposure control operations performed by the exposure control device of FIG. 8.

FIG. 10 is a timing chart for the exposure control operations in the embodiment having the foregoing configuration. When the solenoid 5 is energized, as shown in FIG. 10, an attraction for the plunger 5a' occurs. The plunger 5a' is then attracted against the repulsive spring 6. The sectors 11 and 12, and sector lever 15 are moved to open by means of the plunger 5. An output of the photo-interruptor 7 changes immediately before an aperture is exposed, which triggers counting to define an exposure control time. When a subject has a high luminance, after a conduction time t2 (t2' when counting is started with the output of a trigger signal by the photo-interruptor 7) is shorter than a conduction time t0 that is a period until the plunger is attracted, the plunger is de-energized. The sectors are then closed. When a subject has a high luminance, the conduction voltage is not changed. On the other hand, when a subject has a low luminance, conduction is continued. With the passing of the conduction time t0, the plunger 5 is attracted, and the sectors 11 and 12 are opened substantially simultaneously. After a time t1 that is longer than the time t0 passes, the solenoid conduction voltage is decreased from V2 to V1. The voltages V2 and V1 assume the same values as those in the first embodiment. After a time t3 (equivalent to an exposure control time t3') that is longer than the time t1 passes, conduction is discontinued, and the sectors 11 and 12 are closed. If the time t3 comes immediately after the time t1, the repulsing of the plunger 5a' varies due to a flux change in the solenoid resulting from a voltage fluctuation. The time t1 is so long that a change depending on a total exposure value lessens. Consequently, an exposure error can be minimized to such an extent that no problem occurs in practice.

As described above, in the exposure control device of the second embodiment, similar to that of the first embodiment, the voltage is decreased after the plunger is attracted. Therefore, the power consumption can be lessened and the heating of the solenoid can be diminished. For a high-luminance subject, an operation for decreasing the conduction voltage of the solenoid is not carried out. For a low-luminance subject, the conduction voltage of the solenoid is decreased according to the timing that the sectors have been opened. A variation or disorder in exposure control resulting from a voltage fluctuation can be minimized to such an extent that no problem occurs in practice.

Next, an exposure control device for a camera representing the third embodiment of the present invention will be described.

Figure 11:
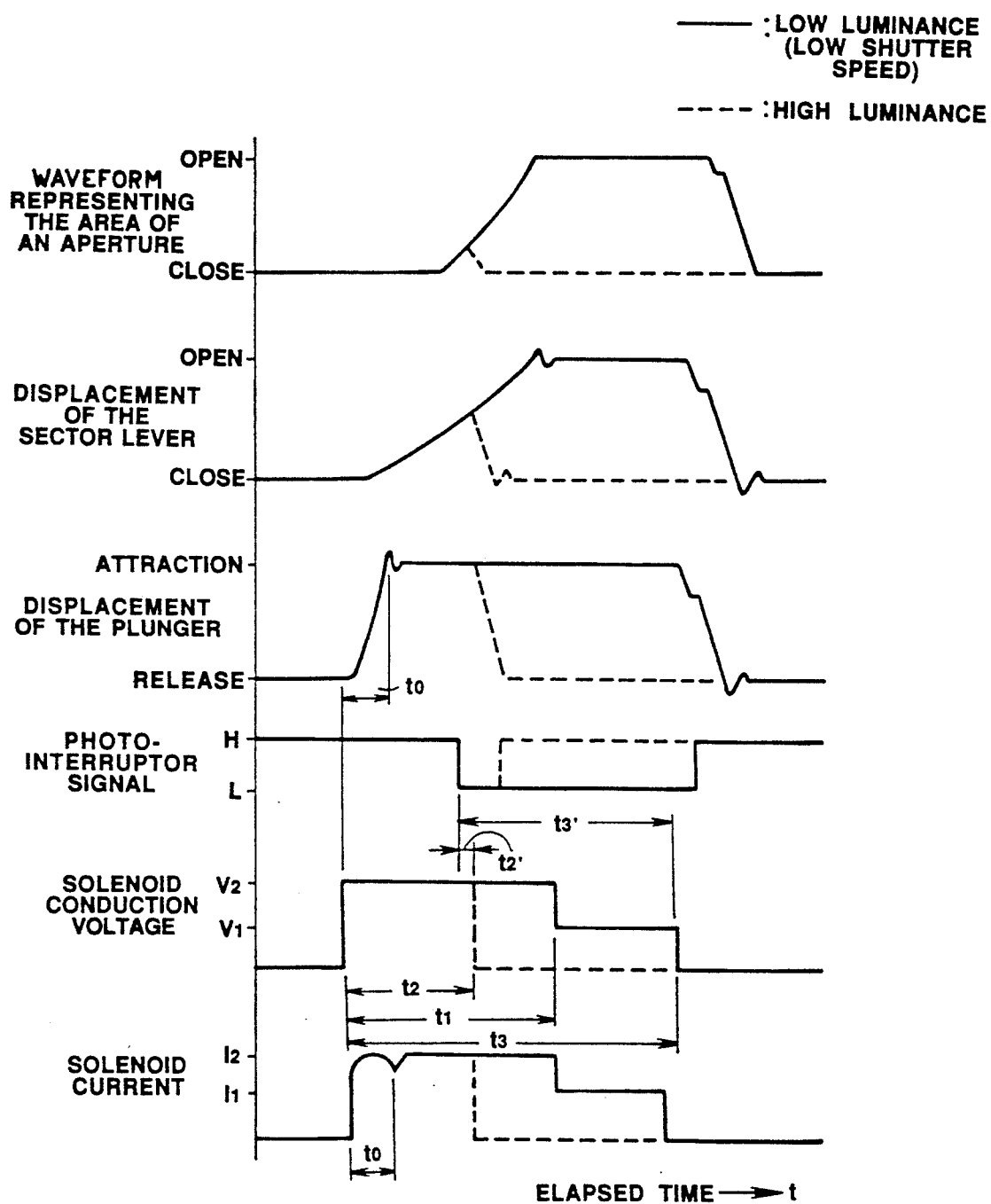
FIG. 11 is a timing chart for the exposure control operations performed by an exposure control device for a camera representing a third embodiment of the present invention.

The configuration of this device is identical to that of the first embodiment. The time t1 that passes before the solenoid conduction voltage is decreased is identical to that in the second embodiment as shown in the timing chart of FIG. 11. In other words, the solenoid conduction voltage is decreased after the sectors are opened. The sector lever 15 is merely in contact with the plunger 5a similar to that in the first embodiment. The opening of the sectors 11 and 12, similar to that in the first embodiment, is not synchronous with or legs behind the movement of the plunger 5a.

In the third embodiment, similar to the first embodiment, the voltage is decreased from V1 to V2 after the plunger is attracted and the sectors are opened. Therefore, the power consumption can be lessened and the heating of the solenoid can be diminished. When a subject has a high luminance, the voltage is not changed. When a subject has a low luminance, the voltage is not decreased after the sectors are opened. A variation or disorder in exposure control resulting from a voltage fluctuation can therefore be minimized to such an extent that no problem occurs in practice. For a high-luminance subject, if an interval between the plunger attraction time t0 and the high-luminance conduction time t2 is short, the voltage is not decreased during an interval from the time t0 to the exposure control time t2'. There is no fear that the precision in exposure control may be affected adversely.

Next, an exposure control device for a camera of the fourth embodiment of the present invention will be described.

Figure 12:
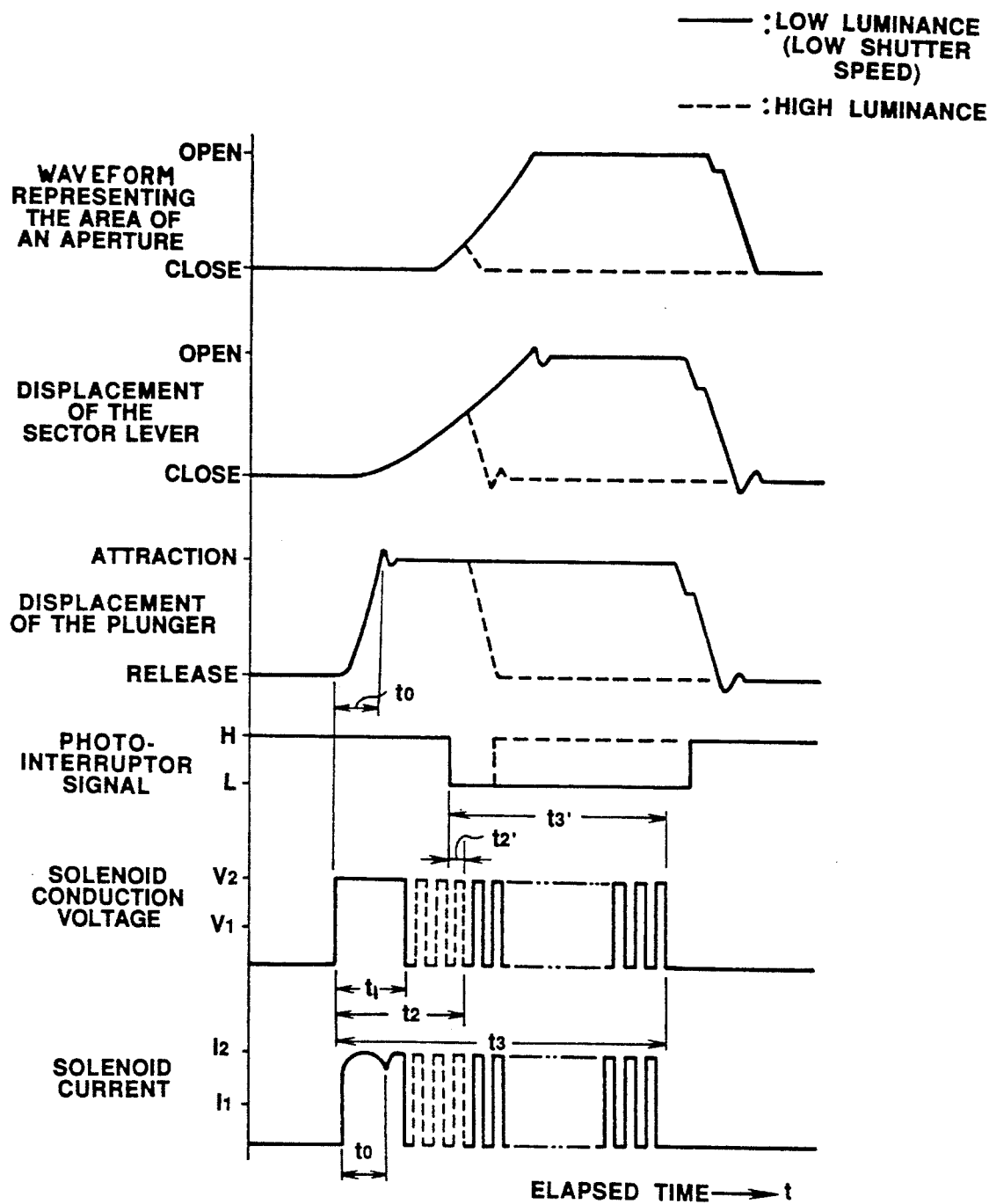
FIG. 12 is a timing chart for the exposure control operations performed by an exposure control device for a camera representing a fourth embodiment of the present invention.

In the devices of the first to third embodiments, the solenoid conduction voltage is decreased after a certain time passes. In the device of this embodiment, the voltage is constant at V2 and the duty ratio for applied pulses is decreased. Specifically, this embodiment has the same configuration as the first embodiment. The conduction voltage is not decreased from V2 to V1 but constant at V2. The duty ratio (on-off ratio) for applied pulses is decreased. FIG. 12 is a timing chart for the exposure control operations of this device.

Pulses for energizing the solenoid 5 are applied initially at a duty ratio of 100%. After a time t1, which is shorter by several milliseconds than an exposure control time t2 for a high-luminance limit, has passed, the duty ratio is changed to, for example, 60% at 1 kHz. The duty ratio of 60% still enables attracting and holding against a repulsive spring. In this embodiment, when the shutter speed is low, applied power is reduced. This is effective in minimizing the power consumption and the heating of the solenoid. Moreover, the timing of changing the duty ratio leads the passing of a time shorter than the shortest exposure control time, which eliminates a time lag in closing the sectors resulting from a change in the duty ratio during exposure control. There will be no adverse effect to degrade the precision in exposure control.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. An exposure control device for a camera, comprising:
   an electromagnetic driving means comprising a solenoid and a plunger, and in which when said solenoid conducts, the plunger is attracted;
   a pressing means for pressing said plunger toward repulsing it from said solenoid;
   a shutter that is opened when said plunger is attracted and that exposes a film surface to light; and
   a conduction control means that, after attracting of said plunger starts, controls a conducting state of said solenoid so that attraction of said plunger will slightly exceed a pressing force said pressing means provides when said plunger is attracted.

2. An exposure control means for a camera according to claim 1, wherein conduction control by said conduction control means is achieved by changing a voltage applied to said solenoid.

3. An exposure control means for a camera according to claim 1, wherein conduction control by said conduction control means is achieved by changing a duty ratio for conduction pulses applied to said solenoid.

4. An exposure control means for a camera according to claim 1, wherein a time that said conduction control means changes the conducting state leads a time that said shutter opens fully.

5. An exposure control means for a camera according to claim 1, wherein a time that said conduction control means changes the conducting state leads a time that an instantaneous exposure value of a film surface becomes maximum.

6. An exposure control means for a camera according to claim 1, wherein a time that said conduction control means changes the conducting state lags behind a time that the shutter opens fully.

7. An exposure control means for a camera according to claim 1, wherein a time that said conduction control means changes the conducting state lags behind a time that an instantaneous exposure value of a film surface becomes maximum.

8. An exposure control means for a camera according to claim 1, wherein a time that said conduction control means changes the conducting state is controlled by starting counting at an onset of energizing said solenoid.

9. An exposure control means for a camera according to claim 1, wherein a time that said conduction control means changes the conducting state is controlled by starting counting responsive to an input of a trigger switch for exposure control.

10. An exposure control means for a camera according to claim 1, wherein a time that said conduction control means changes the conducting state occurs after the plunger is attracted and before an instantaneous exposure of a film surfaces becomes maximum.

11. An exposure control device for a camera, comprising:
    an electromagnetic driving means comprising a solenoid and a plunger, and in which when said solenoid conducts, said plunger is attracted, and when said solenoid does not conduct, said plunger is free to move;
    a pressing means for pressing said plunger toward repulsing it from said solenoid;
    a shutter interlocked with said plunger, shielding an aperture when said plunger is free and unsealing said aperture to pass a beam and eventually expose film to light when said plunger is attracted; and
    a conduction control means for controlling a conduction of said solenoid; said conduction control means decreasing conduction voltage of said solenoid with a voltage equivalent to a force, which said repulsive pressing means provides when said plunger is attracted, as a lower limit, after attracting of said plunger is initiated.

12. An exposure control means for a camera according to claim 11, wherein a time that said conduction control means changes a conducting state leads a time that the shutter opens fully.

13. An exposure control means for a camera according to claim 11, wherein a time that said conduction control means changes a conduction state leads a time that an instantaneous exposure value of a film surface becomes maximum.

14. An exposure control means for a camera according to claim 11, wherein a time that said conduction control means changes a conducting state lags behind a time that the shutter opens fully.

15. An exposure control means for a camera according to claim 11, wherein a time that said conduction control means changes a conducting state lags behind a time that an instantaneous exposure value of a film surface becomes maximum.

16. An exposure control means for a camera according to claim 11, wherein a time that said conduction control means changes a conducting state is controlled by starting counting at an onset of energizing said solenoid.

17. An exposure control means for a camera according to claim 11, wherein a time that said conduction control means changes a conducting state is controlled by initiating counting responsive to an input of a trigger switch for exposure control.

18. An exposure control means for a camera according to claim 11, wherein a time that said conduction control means changes a conducting state comes after said plunger is attracted and before an instantaneous exposure of a film surface becomes maximum.

19. An exposure control device for a camera, comprising:
an electromagnetic driving means comprising a solenoid and a plunger, and in which when said solenoid conducts, said plunger is attracted, and when said solenoid does not conduct, said plunger is free;
a pressing means that presses said plunger toward repulsing it from said solenoid;
a shutter interlocked with said plunger, for shielding a light path when said plunger is free, and unshielding said light path to pass a beam and eventually expose a film surface to light when said plunger is attracted; and
a conduction control means for controlling a conduction of said solenoid; said conduction control means including means for applying conduction pulses to said solenoid and means for decreasing a duty ratio for conduction pulses applied to said solenoid to a power equivalent to a force, which said pressing means provides when said plunger is attracted, as a lower limit, after attracting of said plunger is initiated.

20. An exposure control means for a camera according to claim 19, wherein a time that said conduction control means changes a conducting state leads a time that the shutter opens fully.

21. An exposure control means for a camera according to claim 19, wherein a time that said conduction control means changes a conducting state leads a time that an instantaneous exposure value of a film surface becomes maximum.

22. An exposure control means for a camera according to claim 19, wherein a time that said conduction control means changes a conducting state lags behind a time that the shutter opens fully.

23. An exposure control means for a camera according to claim 19, wherein a time that said conduction control means changes a conducting state lags behind a time that an instantaneous exposure value of a film surface becomes maximum.

24. An exposure control means for a camera according to claim 19, wherein a time that said conduction control means changes a conducting state is controlled by initiating counting at an onset of energizing the solenoid.

25. An exposure control means for a camera according to claim 19, wherein a time that said conduction control means changes a conducting state is controlled by initiating counting responsive to an input of a trigger switch for exposure control.

26. An exposure control means for a camera according to claim 19, wherein a time that said conduction control means changes a conducting state occurs after said plunger is attracted and before an instantaneous exposure of a film surface becomes maximum.

27. An exposure control device for a camera, comprising:
an electromagnetic driving means comprised of a solenoid and a plunger, and in which when said solenoid conducts, said plunger is attracted, and when said solenoid does not conduct, said plunger is free to move;
a pressing means that presses said plunger toward repulsing it from said solenoid;
a driven means interlocked with said plunger, and which is not driven when said plunger is free, and is driven when said plunger is attracted; and
a conduction control means for controlling a conduction of said solenoid; said conduction control means decreasing one of a solenoid conduction voltage and a pulse duty ratio of pulses applied to the solenoid to provide a power equivalent to a force, which said repulsive spring provides when said plunger is attracted, as a lower limit, after attracting of said plunger is initiated.

28. An exposure control device for a camera according to claim 27, wherein a time that said conduction control means changes a conducting state leads a time that a displacement of said driven means becomes maximum.

29. An exposure control device for a camera, comprising:
an electromagnetic driving means comprised of a solenoid and a plunger, and in which when said solenoid conducts, said plunger is attracted;
a shutter that exposes a film surface to light when said plunger is attracted; and
a detecting means for detecting when said shutter changes from an open state to a closed state;
means for decreasing a driving force applied to said electromagnetic driving means responsive to one of the following events:
after an attracting of said plunger starts, after said detecting means detects when said shutter changes from a closed state to an open state, and after a specified time passes.

30. An exposure control device for a camera, comprising:
shutter blades for selectively opening and closing an aperture through which photographic light passes;
a plunger means comprised of a plunger and a solenoid, wherein, when said solenoid conducts, said plunger is attracted to said solenoid;
a first pressing means for pressing said shutter blades toward opening to uncover said aperture;

a second pressing means for pressing said plunger outside said solenoid wherein said shutter blades are pressed toward closing to shield said aperture; and a control means for energizing said solenoid with a given power, attracting said plunger to said solenoid against a force of said second pressing means wherein said first pressing means causes said shutter blades to open said aperture, and then decreasing the given power applied to said solenoid.

31. An exposure control device for a camera according to claim 30, wherein said decreasing of power is achieved by causing a drop in a voltage applied to said solenoid.

32. An exposure control device for a camera according to claim 30, wherein said decreasing of power is achieved by repeatedly turning on and off a voltage applied to said solenoid to alter a duty ratio.

33. An exposure control device for a camera, comprising:
shutter blades for selectively opening and closing an aperture through which photographic light passes;
a plunger means comprising a plunger and a solenoid, and in which when said solenoid conducts, said plunger is driven by a magnetic field created by said solenoid;
a first pressing means for pressing said shutter blades toward opening so as to uncover said aperture;
a second pressing means for pressing said plunger in a second direction opposite a first direction in which said plunger moves when driven by energization of said solenoid, so that said shutter blades are pressed against said first pressing means toward closing to shield said aperture; and
a control means providing power for energizing said solenoid, to drive said plunger against said second pressing means due to a magnetic field created by said solenoid so that said first pressing means causes said shutter blades to uncover said aperture, and then decreases the power initially applied to said solenoid.

34. An exposure control device for a camera according to claim 33, wherein said decreasing of power is achieved by causing a drop in voltage applied to said solenoid.

35. An exposure control device for a camera according to claim 33, wherein said decreasing of power is achieved by repeatedly turning on and off a voltage applied to said solenoid to change a duty ratio.

36. An exposure control device for a camera, comprising:
aperture means that forms an aperture through which photographic light passes;
electromagnetic driving means; said electromagnetic driving means driving said aperture means toward opening when energized;
a first pressing means for pressing said aperture means toward opening to form said aperture;
a second pressing means for pressing said aperture means in a second direction opposite a first direction in which said aperture means is driven when energized by means of said electromagnetic driving means, so that said aperture means is pressed against said first pressing means to close said aperture; and
a control means providing power for energizing said electromagnetic driving means, to drive said electromagnetic driving means against said second pressing means so that said first pressing means causes said aperture means to form said aperture, and then decreases the power initially applied to said electromagnetic driving means.

37. An exposure control device for a camera according to claim 36, wherein said decreasing of power is achieved by causing a drop in voltage applied to said electromagnetic driving means.

38. An exposure control device for a camera according to claim 36, wherein said decreasing of power is achieved by repeatedly turning on and off a voltage applied to said electromagnetic driving means.

39. An exposure control device for a camera, comprising:
aperture means for selectively forming an aperture through which photographic light passes;
an electromagnetic driving means; said electromagnetic driving means driving said aperture means toward opening when energized;
a pressing means for pressing said aperture means in a second direction opposite a first direction in which said aperture means is driven when energized by said electromagnetic driving means, so that said aperture means is pressed to close said aperture; and
a control means providing power for energizing said electromagnetic driving means, to drive said electromagnetic driving means against said pressing means so that said aperture means forms an aperture, and then decreases the power initially applied to said electromagnetic driving means.

40. An exposure control device for a camera according to claim 39, wherein said decreasing of power is achieved by means causing a drop in a voltage applied to said electromagnetic driving means.

41. An exposure control device for a camera according to claim 39, wherein said decreasing of power is achieved by means for repeatedly turning on and off a voltage applied to said electromagnetic driving means.

42. An exposure control device for a camera according to claim 39, wherein said aperture means includes two shutter blades.

43. An exposure control device for a camera according to claim 39, wherein said electromagnetic driving means is comprised of a plunger and a solenoid.

44. An exposure control device for a camera, comprising:
electromagnetic driving means comprising a plunger and a solenoid for attracting said plunger and urging said plunger in a first direction when energized;
bias means for normally urging said plunger in a direction opposite said first direction;
shutter means responsive to movement of said plunger in said first direction to open a photographing light path for exposing a film surface to light; and
conduction control means providing power for said solenoid, said control means including means for providing a given conducting state for urging said plunger in said first direction and for altering said conducting state to a level where the attraction of said plunger by said solenoid slightly exceeds an urging force provided by said bias means.

45. An exposure control means for a camera according to claim 44 wherein said conduction control means includes means for altering a voltage applied to said solenoid.

46. An exposure control means for a camera according to claim 44 wherein said conduction control means further comprises means for applying conduction pulses to said solenoid and means for changing a duty ratio of said conduction pulses for altering an attraction force of the solenoid.

47. A method for operating an exposure control device for a camera, comprising:

electromagnetic driving means comprising a plunger and a solenoid for attracting said plunger and urging said plunger in a first direction when energized;

bias means for normally urging said plunger in a direction opposite said first direction;

shutter means responsive to movement of said plunger in said first direction to open a photographing light path for exposing a film surface to light; said method comprising the steps of:

(a) energizing the solenoid with a given power to urge said plunger in said first direction to open the shutter; and (b) altering said given power to a level where the attraction of said plunger by said solenoid slightly exceeds an urging force provided by said bias means.

48. The method of claim 47 wherein step (b) further comprises altering a voltage applied to said solenoid.

49. The method of claim 47 wherein step (a) further comprises applying conduction pulses to said solenoid and step (b) further comprises changing a duty ratio of said conduction pulses for altering an attraction force of the solenoid.

50. The method of claim 47 wherein step (b) is initiated a given time after a maximum displacement of the plunger.

51. The method of claim 47 wherein step (b) is initiated a given time after initiation of opening of the shutter.

52. The method of claim 47 wherein step (b) is initiated a given time before a film plane receiver maximum exposure to photographing light.

* * * * *

UNITED STATES PATENT AND TRADEMARK OFFICE
CERTIFICATE OF CORRECTION

PATENT NO. :   5,325,148
DATED      :   June 28, 1994
INVENTOR(S) :  Moriya Katagiri and Toshiaki Ishimaru It is certified that error appears in the above-indentified patent and that said Letters Patent is hereby corrected as shown below:

Column 9, line 3, change "legs" to --lags--.

Column 9, line 11, delete "not".

Signed and Sealed this

Twenty-third Day of May, 1995

Attest:

BRUCE LEHMAN

*Attesting Officer*            *Commissioner of Patents and Trademarks*